UNITED STATES PATENT OFFICE.

ISAAC RORABACK, OF SHREVEPORT, LOUISIANA.

IMPROVED SOAP MIXTURE.

Specification forming part of Letters Patent No. 16,750, dated March 3, 1857.

*To all whom it may concern:*

Be it known that I, ISAAC RORABACK, of the parish of Caddo, State of Louisiana, have invented a new and Improved Article of Compound Chemical Soap; and I do hereby declare that the following is a full and exact description of the ingredients for making the same.

Take five pounds of white opodeldoc soap of commerce, one-fourth pound sal-soda, one tablespoon of spirits of turpentine, one tablespoon of spirits of wine, one tablespoon of spirits of hartshorn, one and a half gallon of rain or soft water. Take one and a half gallon of rain or soft water, put it into a pot, hang it over the fire, and as soon as the water boils put in five (5) pounds of opodeldoc soap, (having it shaved up fine—this is done by holding the bar in the hand and passing it up and down on the face of a carpenter's plane until the bar is shaved up,) one-fourth (¼) pound of sal-soda, one table-spoonful of spirits of turpentine, one table-spoonful of spirits of hartshorn, one table-spoonful of spirits of wine. Stir it well for three (3) or five (5) minutes, or until it is well dissolved. Then set it down by the fire, take one pint of the hot fluid, put it into a bowl, and take as much China vermilion as will lie on a ten-cent piece, put it into the bowl of hot fluid and stir it well until well mixed, then pour it into the pot of soap and stir two (2) or three (3) times, then pour it all out in vessels and let it cool, and it is fit for use. This soap will become hard and solid in a few weeks.

What I claim as my own invention, and desire to secure by Letters Patent, is—

The compounding of them in such proportions (as described above) as to form a solid of suitable consistency, which I believe excels any other soap in its suitableness for cleansing clothes of every description, and for toilet purposes generally, as well as in point of cheapness and convenience and dispatch with which it is made.

ISAAC RORABACK.

Witnesses:
A. B. STOUGHTON,
THOS. H. UPPERMAN.